United States Patent
Ko et al.

(10) Patent No.: US 12,503,573 B2
(45) Date of Patent: Dec. 23, 2025

(54) METHOD FOR PREPARING WET MASTER BATCH ELASTOMER COMPOSITION

(71) Applicant: KOREA KUMHO PETROCHEMICAL CO., LTD., Seoul (KR)

(72) Inventors: Jae Young Ko, Daejeon (KR); Eunjoo Kim, Seoul (KR); Seung Hyun Kim, Cheongju-si (KR); Kyeongjun Cho, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 550 days.

(21) Appl. No.: 18/095,828

(22) Filed: Jan. 11, 2023

(65) Prior Publication Data
US 2024/0124687 A1     Apr. 18, 2024

(30) Foreign Application Priority Data
Oct. 14, 2022   (KR) .................. 10-2022-0132000

(51) Int. Cl.
*C08K 5/548* (2006.01)
*C08F 236/10* (2006.01)
*C08K 3/36* (2006.01)

(52) U.S. Cl.
CPC ............ *C08K 5/548* (2013.01); *C08F 236/10* (2013.01); *C08K 3/36* (2013.01)

(58) Field of Classification Search
CPC .......... C08K 5/548; C08K 3/36; C08F 236/10
USPC .......................................... 524/262
See application file for complete search history.

(56) References Cited

U.S. PATENT DOCUMENTS

| | | | |
|---|---|---|---|
| 7,312,271 B2 | 12/2007 | Chen et al. | |
| 8,865,799 B2 | 10/2014 | Wallen et al. | |
| 2014/0065337 A1* | 3/2014 | Shiratani | C07C 381/02 524/157 |
| 2015/0252176 A1* | 9/2015 | Hardiman | C08F 2/44 523/351 |
| 2017/0306107 A1* | 10/2017 | Xiong | C08J 3/22 |

* cited by examiner

*Primary Examiner* — Kelechi C Egwim
(74) *Attorney, Agent, or Firm* — Sughrue Mion, PLLC

(57) ABSTRACT

Disclosed is a method for preparing a wet master batch elastomer composition, comprising a first step of feeding silica particles and an organic silane coupling agent into an SSBR polymer solution; and a second step of grinding the silica particles, while stirring the SSBR polymer solution into which the silica particles and the organic silane coupling agent are fed, wherein a ratio of an average particle size of the ground silica particles to an average particle size of the silica particles is less than or equal to 0.8, and wherein the wet master batch elastomer composition has a bound rubber content of 30 to 80 wt. %.

9 Claims, 1 Drawing Sheet

METHOD FOR PREPARING WET MASTER BATCH ELASTOMER COMPOSITION

CROSS-REFERENCE TO RELATED APPLICATION

This application claims priority from Korean Patent Application No. 10-2022-0132000 filed Oct. 14, 2022, the disclosure of which is incorporated herein by reference in its entirety.

TECHNICAL FIELD

The present specification relates to a method for preparing a wet master batch elastomer composition.

BACKGROUND ART

In general, a tire tread is manufactured by mixing rubber with a filler in a mixer during a process for manufacturing a tire. The rubber is a mixture of a styrene-butadiene copolymer and a conjugated diene-based rubber, and the filler is carbon black or silica used alone or in combination as a reinforcing agent.

Silica, an environmentally friendly material, is popular as a reinforcing agent (filler material) of tires nowadays when environmental regulations become more stringent and oil prices remain high, and is used as a reinforcing agent for a "green tire" that has been an issue recently. Thus, the amount of silica used has increased sharply and attention has focused on silica. However, when using silica as a reinforcing agent, interaction between silica particles causes agglomeration, and silica particles agglomerate together to form large clusters. Thus, it is difficult to mix silica with rubber and disperse silica. The dispersion of silica in rubber significantly affects tire wear and tire lifespan, and thus it is necessary to maximize the dispersibility of silica when compounding.

Often, in order to increase the dispersibility of a reinforcing agent and streamline a process for manufacturing a tire, a silica master batch type elastomer is used in which silica has been mixed. When producing a silica master batch type elastomer using a diene-based copolymer prepared by solution polymerization, most of the silica is lost by water during steam stripping because of the hydrophilic nature of silica. Thus, it is not commercially practical to produce a silica master batch type elastomer using a solution polymer.

Meanwhile, when using hydrophobated silica as a reinforcing agent for tires, mechanical properties required for tires can hardly be obtained because chemical bonding with rubber is impossible. In order to maximize dispersibility and ensure good mechanical properties, many studies have been suggested to more effectively use silica.

U.S. Pat. No. 8,865,799 discloses the making of a silica master batch by organically modifying hydrophobated silica and stirring a silica slurry with ESBR latex. However, 5% alcohol is contained during the organically modification process, and thus an additional purification process for water and alcohol is required after solvent recovery.

U.S. Pat. No. 7,312,271 discloses the production of a silica master batch by dispersing silica in a solvent such as SSBR (Solution styrene butadiene rubber), and accordingly, it is easy to recover the solvent. However, there is a limit that the silica is lost by water during stripping because of the hydrophilic nature of silica. In this case, a method for introducing pre-treated silica (Ciptane® LP, PPG Industries) might be carried out, but an additional process is required for organically modifying the silica. Thus, in producing a silica-SSBR composite, the time to be consumed and the cost to be incurred increase, and also physical properties required for high performance tires can hardly be obtained.

Therefore, there is a need for a silica master batch type elastomer that improves the dispersibility and bonding strength of silica and achieves excellent properties.

PRIOR ART REFERENCE

Patent Document (Patent Document 0001) U.S. Pat. No. 8,865,799
(Patent Document 0002) U.S. Pat. No. 7,312,271

SUMMARY OF INVENTION

Technical Task

An aspect of the present specification is to provide a method for preparing a wet master batch elastomer composition with improved dispersibility and bonding strength of silica.

Means for Solving Technical Task

According to an aspect, the present specification provides a method for preparing a wet master batch elastomer composition, comprising a first step of feeding silica particles and an organic silane coupling agent into an SSBR polymer solution; and a second step of grinding the silica particles, while stirring the SSBR polymer solution into which the silica particles and the organic silane coupling agent are fed, wherein a ratio of an average particle size of the ground silica particles to an average particle size of the silica particles is less than or equal to 0.8, and wherein the wet master batch elastomer composition has a bound rubber content of 30 to 80 wt. %.

In an embodiment, a ratio of an average particle size of the ground silica particles to an average particle size of the silica particles may be less than or equal to 0.5.

In an embodiment, a ratio of an average particle size of the ground silica particles to an average particle size of the silica particles may be less than or equal to 0.2.

In an embodiment, the stirring may be performed by a grinding stirrer.

In an embodiment, a stirring rate of the stirring may be greater than or equal to 1,000 rpm.

In an embodiment, a stirring time of the stirring may be 0.1 to 60 minutes.

In an embodiment, a content of the silica particles may be 40 to 200 parts by weight based on 100 parts by weight of the SSBR polymer.

In an embodiment, the organic silane coupling agent may comprise a first organic silane compound represented by Formula 1 and a second organic silane compound represented by Formula 2:

$$(R_1O)_3\text{—Si—}R_2\text{—S—}R_3OR_4 \qquad \text{[Formula 1]}$$

wherein $R_1$ and $R_3$ are an aliphatic hydrocarbon group having 1 to 4 carbon atoms, $R_2$ is an aliphatic hydrocarbon group having 3 to 8 carbon atoms, and $R_4$ is an aliphatic hydrocarbon group having 1 to 20 carbon atoms,

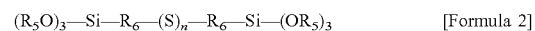

$$(R_5O)_3\text{—Si—}R_6\text{—(S)}_n\text{—}R_6\text{—Si—}(OR_5)_3 \qquad \text{[Formula 2]}$$

wherein each $R_5$ is independently an aliphatic hydrocarbon group having 1 to 4 carbon atoms, each $R_6$ is independently an aliphatic hydrocarbon group having 3 to 8 carbon atoms, and n is an integer of 1 to 4.

In an embodiment, a content of the organic silane coupling agent may be 0.1 to 20 parts by weight based on 100 parts by weight of the SSBR polymer.

Effect of Invention

A method for preparing a wet master batch elastomer composition according to an aspect of the present specification may improve the dispersibility of silica particles and the bonding strength thereof with rubber without using organically modified silica or performing a step of organically modifying silica. In particular, the method according to an aspect of the present specification may omit a pretreatment step of organically modifying silica, while using pure silica, thereby reducing the amount of solvent to be used and the total processing time, and thus dramatically reducing the processing cost.

The effects of an aspect of the present specification are not limited to the above-mentioned effects, and it should be understood that the effects of the present specification include all effects that could be inferred from the configuration described in the detailed description of the specification or the appended claims.

BEST MODE FOR CARRYING OUT THE INVENTION

Figure 1:
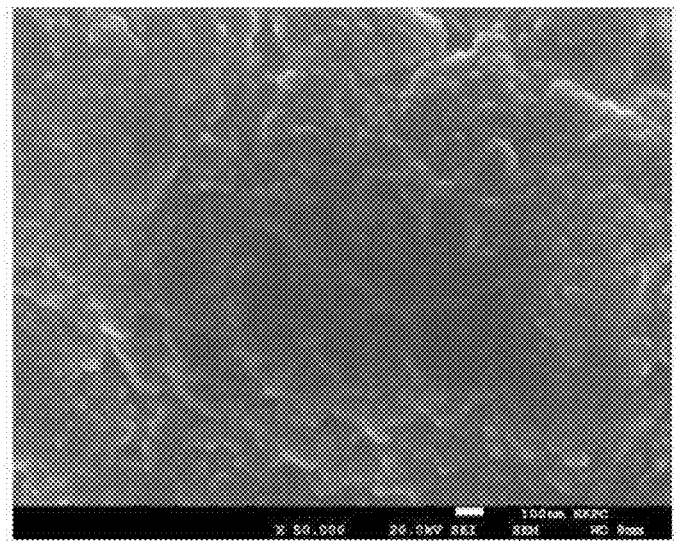
FIG. 1 is an SEM image of a wet master batch elastomer composition according to Example 2 of the present specification.

Hereinafter, an aspect of the present specification will be explained. The description of the present specification, however, may be modified in different ways, and should not be construed as limited to the embodiments set forth herein. Also, in order to clearly explain an aspect of the present specification in the drawing, portions that are not related to the explanation are omitted.

Throughout the specification, it should be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

When a range of numerical values is described herein, the value has the precision of the significant figures provided according to the standard rules in chemistry for significant figures, unless a specific range thereof is stated otherwise. For example, 10 includes a range of 5.0 to 14.9 and the number 10.0 includes a range of 9.50 to 10.49.

Method for Preparing Wet Master Batch Elastomer Composition

A method for preparing a wet master batch elastomer composition according to an aspect may comprise a first step of feeding silica particles and an organic silane coupling agent into an SSBR polymer solution; and a second step of grinding the silica particles, while stirring the SSBR polymer solution into which the silica particles and the organic silane coupling agent are fed.

In the first step, silica particles and an organic silane coupling agent may be fed into an SSBR polymer solution.

The SSBR polymer may be prepared by solution polymerization of a conjugated diene-based monomer and an aromatic vinyl monomer.

The conjugated diene-based monomer may be one selected from the group consisting of 1,3-butadiene, 2,3-dimethyl-1,3-butadiene, 2-ethyl-1,3-butadiene, 1,3-pentadiene, isoprene and combinations of two or more thereof, but is not limited thereto.

The aromatic vinyl monomer may be one selected from the group consisting of styrene, α-methylstyrene, ethylstyrene, isopropylstyrene, halogenated styrene and combinations of two or more thereof, but is not limited thereto.

The solvent used in the solution polymerization may be an aromatic solvent, an aliphatic solvent, a cyclic solvent, etc. Examples of the solvent may be cyclohexane, toluene, n-hexane, n-heptane and at least one selected therefrom, but are not limited thereto.

The term "master batch" as used herein means a formulation in which additives at high concentration have been dispersed when preparing a rubber compound. The master batch may increase the dispersibility of additives in a rubber matrix and accordingly improve the physical properties of the rubber compound.

Master batches may be classified into dry master batches (DMB) and wet master batches (WMB). Dry master batches are prepared by a one-step process of feeding raw materials into a mixer and then mixing the same. However, when applying a dry master batch to a high content of silica, a silica mixture which has degraded dispersibility and is non-uniform may be prepared. On the other hand, wet master batches are prepared by mixing raw materials with a slurry, followed by agglomeration, allowing a high content of silica to be uniformly dispersed. Thus, the wet master batch may increase the processability of a rubber compound, and improve abrasion resistance and fuel efficiency.

A wet master batch elastomer compound according to an aspect of the present specification is prepared by a wet master batch method, allowing a high content of silica particles to be uniformly dispersed and increasing the bonding strength with the SSBR polymer. Accordingly, a final rubber product may have excellent properties.

The silica particles may be pure silica, and the silica particles may have a BET specific surface area of 100 to 300 $m^2/g$. For example, the BET specific surface area may be 100 $m^2/g$, 110 $m^2/g$, 120 $m^2/g$, 130 $m^2/g$, 140 $m^2/g$, 150 $m^2/g$, 160 $m^2/g$, 170 $m^2/g$, 180 $m^2/g$, 190 $m^2/g$, 200 $m^2/g$, 210 $m^2/g$, 220 $m^2/g$, 230 $m^2/g$, 240 $m^2/g$, 250 $m^2/g$, 260 $m^2/g$, 270 $m^2/g$, 280 $m^2/g$, 290 $m^2/g$, 300 $m^2/g$ or a value between any two values thereof, but is not limited thereto.

A content of the silica particles may be 40 to 200 parts by weight based on 100 parts by weight of the SSBR polymer. For example, the content may be 40 parts by weight, 50 parts by weight, 60 parts by weight, 70 parts by weight, 80 parts by weight, 90 parts by weight, 100 parts by weight, 110 parts by weight, 120 parts by weight, 130 parts by weight, 140 parts by weight, 150 parts by weight, 160 parts by weight, 170 parts by weight, 180 parts by weight, 190 parts by weight, 200 parts by weight or a value between any two values thereof. When the content of the silica particles is less than the above range, the dispersibility of silica may deteriorate. When the content is greater than the above range, the loss rate of silica may rise and the density may increase, and thus the process may not proceed easily.

The organic silane coupling agent may impart hydrophobicity to the surface of silica particles in the state where silica particles are bonded to the SSBR polymer. Accordingly, the bonding strength between the SSBR polymer and the silica particles may be stably maintained, thereby preventing the loss of silica. Also, the organic silane coupling agent may prevent re-agglomeration of silica particles, thereby allowing the silica particles to be dispersed stably in the SSBR polymer matrix.

Here, it should be noted that the organic silane coupling agent while having been mixed with silica particles is not fed into the SSBR polymer solution, but that the organic silane coupling agent and the silica particles are fed into the SSBR polymer solution, separately. In prior art, a wet master batch was produced by mixing an organic silane coupling agent and silica particles in advance and organically modifying the surface of silica particles, and then feeding the organically modified silica into the SSBR polymer solution. According to prior art, the process was disadvantageous because it took a long period of time to organically modify the surface of silica particles and a large amount of solvent was required. On contrary, according to the present specification, there is an advantage that the manufacturing prices may be significantly reduced because an organically modifying process is left out, leading not only to reduction of the total processing time but also to reduction of the amount of solvent.

As an example, the organic silane coupling agent may comprise a first organic silane compound represented by Formula 1 and a second organic silane compound represented by Formula 2:

$(R_1O)_3$—Si—$R_2$—S—$R_3OR_4$ [Formula 1]

wherein $R_1$ and $R_3$ are an aliphatic hydrocarbon group having 1 to 4 carbon atoms, $R_2$ is an aliphatic hydrocarbon group having 3 to 8 carbon atoms, and $R_4$ is an aliphatic hydrocarbon group having 1 to 20 carbon atoms,

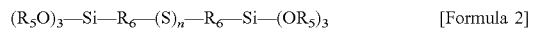
$(R_5O)_3$—Si—$R_6$—$(S)_n$—$R_6$—Si—$(OR_5)_3$ [Formula 2]

wherein each $R_5$ is independently an aliphatic hydrocarbon group having 1 to 4 carbon atoms, each $R_6$ is independently an aliphatic hydrocarbon group having 3 to 8 carbon atoms, and n is an integer of 1 to 4.

The first organic silane compound may include a thioester group (RCO—S—R'), for example, 3-octanoylthiopropyl triethoxysilane (NXT), but is not limited thereto.

The second organic silane compound may be selected from the group consisting of, for example, bis[3-(triethoxysilyl)propyl] tetrasulfide (TESPT), bis[3-(triethoxysilyl)propyl]disulfide (TESPD) and a mixture thereof, but is not limited thereto.

In particular, a mixture of the first organic silane compound and the second organic silane compound as the organic silane coupling agent may effectively prevent the loss and agglomeration of silica, thereby enhancing the properties of a wet master batch elastomer composition.

As an example, a content of the organic silane coupling agent may be 0.1 to 20 parts by weight based on 100 parts by weight of the SSBR polymer. For example, the content may be 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, 20 parts by weight or a value between any two values thereof. When the content of the organic silane coupling agent is out of the above range, the loss rate and agglomeration rate of silica may increase, and the bonding strength between the SSBR polymer and silica may deteriorate, resulting in degradation of the properties of a wet master batch elastomer composition.

In the second step, the silica particles may be ground, while stirring the SSBR polymer solution into which the silica particles and the organic silane coupling agent are fed. The second step may be a step in which the silica particles are ground, the ground silica particles and the organic silane coupling agent are bonded to form organically modified silica, and the organically modified silica and rubber are bonded to form bound rubber.

As an example, the stirring and grinding may be performed by a grinding stirrer. The grinding stirrer comprises an impeller therein, unlike a typical stirrer for simple stirring and mixing. In such grinding stirrers, silica particles dispersed in the SSBR polymer solution are ground while passing through the rotating impeller. Examples of the impeller may include a paddle-type impeller, a propeller-type impeller, a turbine-type impeller, an anchor-type impeller, a helical-type impeller, etc., but are not limited thereto.

As an example, in the second step, a stirring rate of the stirring may be greater than or equal to 1,000 rpm. For example, the stirring rate may be greater than or equal to 1,000 rpm, 1,100 rpm, 1,200 rpm, 1,300 rpm, 1,400 rpm, 1,500 rpm, 1,600 rpm, 1,700 rpm, 1,800 rpm, 1,900 rpm, 2,000 rpm, 2,100 rpm, 2,200 rpm, 2,300 rpm, 2,400 rpm, 2,500 rpm, 2,600 rpm, 2,700 rpm, 2,800 rpm, 2,900 rpm, 3,000 rpm, or more, but is not limited thereto. When the stirring rate is less than 1,000 rpm, silica is not sufficiently ground, resulting in degradation of the dispersibility of silica and decrease in the bonding strength with the SSBR polymer.

In the second step, a stirring time of the stirring may be 0.1 to 60 minutes. For example, the stirring time may be 0.1 minutes, 0.2 minutes, 0.3 minutes, 0.4 minutes, 0.5 minutes, 0.6 minutes, 0.7 minutes, 0.8 minutes, 0.9 minutes, 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes, 26 minutes, 27 minutes, 28 minutes, 29 minutes, 30 minutes, 31 minutes, 32 minutes, 33 minutes, 34 minutes, 35 minutes, 36 minutes, 37 minutes, 38 minutes, 39 minutes, 40 minutes, 41 minutes, 42 minutes, 43 minutes, 44 minutes, 45 minutes, 46 minutes, 47 minutes, 48 minutes, 49 minutes, 50 minutes, 51 minutes, 52 minutes, 53 minutes, 54 minutes, 55 minutes, 56 minutes, 57 minutes, 58 minutes, 59 minutes, 60 minutes or a value between any two values thereof. When the stirring time is out of the above range, silica is not sufficiently ground, resulting in degradation of the dispersibility of silica and decrease in the bonding strength with the SSBR polymer.

As an example, the SSBR polymer particles may be physisorbed in the pores of the silica particles by the stirring in the second step. Accordingly, the physical bonding strength between the SSBR polymer and the silica particles may increase. In addition, as the silica particles are ground by the stirring, the average particle size of silica gets smaller when fed and the surface area of the silica particles gets larger. Accordingly, a large amount of silanol group is produced, and the active site thereof gets larger, thereby enhancing the chemical bonding with the SSBR polymer. In other words, the silica particles may form both a physical and chemical bonding with the SSBR polymer by the stirring and grinding in the second step. Thus, a bound rubber content may be effectively increased in the wet master batch elastomer composition.

As an example, a ratio of an average particle size of the ground silica particles to an average particle size of the silica particles may be less than or equal to 0.8. For example, the ratio may be less than or equal to 0.8, 0.7 or 0.6, preferably less than or equal to 0.5, 0.4 or 0.3, more preferably less than or equal to 0.2, 0.1, 0.09, 0.08, 0.07, 0.06, 0.05 or less, but is not limited thereto. The average particle size of the ground silica particles is not particularly limited, but the ground silica particles may have an average particle size, for example, in nanometer scale. As the ratio of the average particle size of the ground silica particles to the average particle size of the silica particles is lowered, the content and size of the ground silica particle get smaller, which means that the bonding strength with the SSBR polymer may increase.

As an example, in the first step, the organic silane coupling agent may be further added to the SSBR polymer solution.

As an example, the wet master batch elastomer composition may have a bound rubber content of 30 to 80 wt. %. For example, the bound rubber content may be 30 wt. %, 31 wt. %, 32 wt. %, 33 wt. %, 34 wt. %, 35 wt. %, 36 wt. %, 37 wt. %, 38 wt. %, 39 wt. %, 40 wt. %, 41 wt. %, 42 wt. %, 43 wt. %, 44 wt. %, 45 wt. %, 46 wt. %, 47 wt. %, 48 wt. %, 49 wt. %, 50 wt. %, 51 wt. %, 52 wt. %, 53 wt. %, 54 wt. %, 55 wt. %, 56 wt. %, 57 wt. %, 58 wt. %, 59 wt. %, 60 wt. %, 61 wt. %, 62 wt. %, 63 wt. %, 64 wt. %, 65 wt. %, 66 wt. %, 67 wt. %, 68 wt. %, 69 wt. %, 70 wt. %, 71 wt. %, 72 wt. %, 73 wt. %, 74 wt. %, 75 wt. %, 76 wt. %, 77 wt. %, 78 wt. %, 79 wt. %, 80 wt. % or a value between any two values thereof. When the bound rubber content is out of the above range, the bonding strength between the SSBR polymer and the silica particles may decrease, and the miscibility with other compounds may be reduced.

As a non-limiting example, the method for preparing a wet master batch elastomer composition may further comprise a third step of removing the solvent after the second step and subjecting to drying and solidifying. The solvent may be removed by stripping, devolatilization or roll drying, but the process is not limited thereto. The drying may be performed at a temperature of 100° C. or less, but the temperature is not limited thereto. Meanwhile, before drying after removing the solvent, a process of forming solids from which the solvent is removed into pellets or veils may be further comprised, but is not limited thereto.

As a non-limiting example, the method for preparing a wet master batch elastomer composition may further comprise a fourth step of compounding the silica-SSBR composite prepared in the third step with an additive.

The additive may be selected from the group consisting of stearic acid, zinc oxide (ZnO), silica, TDAE oil, diamine antioxidant (6PPD), silane coupling agent (X50S), vulcanization accelerator (CZ), diphenylguanidine (DPG), sulfur and combinations thereof, but is not limited thereto.

The method for preparing a wet master match elastomer composition may further comprise a step of adding a reaction accelerator, an antioxidant, a heat stabilizer, a light stabilizer, an anti-ozone agent, a processing aid, a plasticizer, an adhesive, a blowing agent, a dye, a pigment, a wax, an extender, an organic acid, a retarder, a metal oxide, an activator, etc., known in the rubber industry, to produce a molded or extruded product of a wet master batch elastomer composition.

The wet master batch elastomer composition may be used as a cable sheath, a hose, a drive belt, a conveyor belt, a roll cover, a shoe sole, a gasket, a brake element, or a tire. In particular, it may be suitable for a tire tread.

The wet master batch elastomer composition prepared by the above method may enhance the mechanical properties and abrasion resistance and also solve the dust problem of silica occurring during compounding, when used as a tire material, as compared with conventional silica tire materials. Also, it reduces the tire compounding time and improves tire processability and silica dispersibility.

Hereinafter, examples of the present specification will be described in more detail. However, the following experimental results describe only representative experimental results among the above examples and the scope and content of the present specification may not be construed as narrowed or limited by the examples. Each effect of the various embodiments of the present specification not explicitly presented below will be specifically described in the corresponding section.

Example 1

150 g of styrene, 438 g of 1,3-butadiene and 3,600 g of cyclohexane were fed into a 10 L stainless steel reactor. Then, 0.5 g of ditetrahydrofurylpropane was added to the reactor. Upon completion of the addition, the temperature inside the reactor was adjusted to 35° C. while rotating a typical stirrer at a stirring rate of 100 rpm. Then, 2.4 mmol of n-butyllithium was added to the reactor to carry out an adiabatic heating reaction. After the reaction temperature reached the highest temperature, about 100° C., 12 g of 1,3-butadiene was further added to substitute butadiene for the reactive terminal group, to prepare a solution styrene-butadiene rubber (SSBR) polymer solution.

Next, after mixing, in the styrene-butadiene rubber polymer solution, 100 parts by weight of silica particles with an organic silane coupling agent in which 1 part by weight of 3-octanoylthiopropyl triethoxysilane (NXT) and 8.6 parts by weight of bis[3-(triethoxysilyl)propyl] tetrasulfide (TESPT) were mixed, based on 100 parts by weight of the styrene-butadiene rubber polymer, the mixture was stirred in a grinding stirrer under the conditions of a stirring rate of 2,000 rpm and a stirring time of 10 minutes. Then, the solvent was removed by stripping, and solids were formed into pellets and dried at a temperature of 80° C., to prepare a wet master batch (WMB). Here, silica particles are pure silica having a BET specific surface area of 200 $m^2/g$.

Next, the wet master batch, 40 parts by weight of TDAE oil as a rubber compounding oil, 3 parts by weight of zinc oxide (ZnO) and 2 parts by weight of stearic acid as vulcanization accelerators, 1 part by weight of N-(1,3-dimethylbutyl)-N'-phenyl-p-phenylenediamine (6PPD) as an antioxidant, and 16 parts by weight of X50S were added, followed by sufficient mixing, to prepare a silica master batch (SMB).

Next, 0.75 parts by weight of sulfur as a crosslinking agent, and 2.2 parts by weight of N-cyclohexyl-2-benzothiazole sulfonamide (CBS) and 1.5 parts by weight of diphenylguanidine (DPG) as vulcanization accelerators were added to the silica master batch, followed by sufficient stirring, to prepare a final master batch (FMB).

Example 2

A final master batch was prepared in the same manner as in Example 1, except that the stirring rate was adjusted to 2,000 rpm and the stirring time was adjusted to 20 minutes when preparing a wet master batch.

Example 3

A final master batch was prepared in the same manner as in Example 1, except that the stirring rate was adjusted to 2,000 rpm and the stirring time was adjusted to 30 minutes when preparing a wet master batch.

Example 4

A final master batch was prepared in the same manner as in Example 1, except that the stirring rate was adjusted to 2,000 rpm and the stirring time was adjusted to 40 minutes when preparing a wet master batch.

Example 5

A final master batch was prepared in the same manner as in Example 1, except that the stirring rate was adjusted to 2,000 rpm and the stirring time was adjusted to 60 minutes when preparing a wet master batch.

Comparative Example 1

A wet master batch elastomer composition was prepared in the same manner as in Example 1, except that the stirring rate was adjusted to 500 rpm and the stirring time was adjusted to 30 minutes when preparing a wet master batch.

Comparative Example 2

A wet master batch elastomer composition was prepared in the same manner as in Example 1, except that the stirring rate was adjusted to 3,000 rpm and the stirring time was adjusted to 30 minutes using a typical high speed stirrer when preparing a wet master batch.

Comparative Example 3

Comparative Example 3 was carried out in the same manner as in Example 1, but a method for preparing a dry master batch was used. Specifically, 100 parts by weight of silica, 40 parts by weight of TDAE oil as a rubber compounding oil, 3 parts by weight of zinc oxide (ZnO) and 2 parts by weight of stearic acid as vulcanization accelerators, 1 part by weight of N-(1,3-dimnethylibutyl)-N'-phenyl-p-pheniylenediamine (6PPD) as an antioxidant, and 16 parts by weight of X50S were added to 100 parts by weight of a solution styrene-butadiene rubber (SSBR) polymer, followed by sufficient mixing, to prepare a silica master batch (SMB).

Next, 0.75 parts by weight of sulfur as a crosslinking agent, and 2.2 parts by weight of N-cyclohexyl-2-benzothiazole sulfonamide (CBS) and 1.5 parts by weight of diphenylguanidine (DPG) as vulcanization accelerators were added to the silica master batch, followed by sufficient stirring, to prepare a final master batch (FMB). Here, silica may be further added when compounding, considering the loss amount thereof.

Comparative Example 4

A final master batch was prepared in the same manner as in Example 2, except that an organic silane coupling agent was not mixed when preparing a wet master batch.

Experimental Example 1

For the wet master batches prepared in Examples 1 to 5, and Comparative Examples 1 and 2, the average particle size of the ground silica particles relative to the average particle size of the silica particles before grinding, and the bound rubber content were measured by the following methods, and the results are shown below in Table 1.

[Method for Measuring Average Particle Size of Silica Particles]

The particle sizes of silica particles in a solvent before removing the solvent were measured using dynamic light scattering (DLS).

[Method for Measuring Bound Rubber Content]

The SSBR polymers that are not bonded to silica were separated from the SSBR polymers that are bonded to silica in a solvent before removing the solvent, and the bound rubber content was measured using gel permeation chromatography (GPC).

TABLE 1

|  | Bound Rubber Content (wt. %) | Ratio of Average Particle Sizes of Silica Particles |
| --- | --- | --- |
| Comparative Example 1 | 26 | 0.95 |
| Comparative Example 2 | 26 | 0.9 |
| Example 1 | 36 | 0.5 |
| Example 2 | 43 | 0.4 |
| Example 3 | 48 | 0.3 |
| Example 4 | 51 | 0.2 |
| Example 5 | 53 | 0.1 |

Referring to Table 1, it can be confirmed that when the stirring rate is less than 1,000 rpm or a grinding stirrer is not used, while mixing the SSBR polymer solution and the silica particles, there are no significant changes in the ratio of the average particle sizes of silica particles and the bound rubber content. On contrary, it can be confirmed that when a grinding stirrer is used and the stirring rate is greater than or equal to 1,000 rpm, the ratio of the average particle sizes of silica particles is reduced and the bonding strength between silica and SSBR rubber is enhanced, as the stirring time gets longer.

Experimental Example 2

For the final master batches prepared in Example 2 and 5, and Comparative Example 3, the bound rubber content was measured by the following method, the compounding processability, and the physical and dynamic properties after compounding were evaluated. The results are shown below in Table 2.

[Method for Measuring Bound Rubber Content]

After staying at room temperature (about 25° C.) for 7 days for conditioning, about 0.5 g of a sample was immersed in 100 ml of toluene (about 25° C.). After 7 days, the sample was taken out of toluene and dried under vacuum until it became a predetermined weight. The bound rubber content was measured by the following equation.

[Bound rubber content (wt. %)]=(MB−MF−MD)/MB×100 wherein MB is the weight (g) of the final master batch before being immersed in toluene; MF is the weight (g) of the filler contained in the final master batch; and MD is the weight (g) of rubber dissolved in toluene.

[Method for Evaluating Physical Properties]

Compound Mooney Viscosity: Mooney viscosities of the polymer and the mixer were measured using a Mooney viscometer Hardness: measured using a SHORE-A hardness machine Tensile strength, 300% modulus, elongation, toughness and dispersibility: measured using a universal test machine (UTM) according to ASTM 3189 Method B Abrasion resistance (DIN/Lamboum): analyzed using a DIN abrasion tester and a Lamboum abrasion tester Dynamic property value of vulcanized rubber (Tan 6): wet traction and fuel efficiency were analyzed using a DMTA 5 instrument from Rheometric under the conditions of 10 Hz frequency and 0.1% deformation.

TABLE 2

|  | Comparative Example 3 | Example 2 | Example 5 |
|---|---|---|---|
| Bound Rubber Content (wt. %) | 48 | 52 | 65 |
| Processability (Comp'd MV) | 100 | 103 | 130 |
| Shore-A Hardness | 100 | 99 | 99 |
| 300% Modulus | 100 | 110 | 106 |
| Tensile Strength | 100 | 110 | 104 |
| Elongation | 100 | 97 | 101 |
| Toughness | 100 | 108 | 107 |
| Dispersibility (Payne Effect) | 100 | 148 | 238 |
| Abrasion Resistance (DIN) | 100 | 110 | 123 |
| Abrasion Resistance (Lambourn) | 100 | 103 | 110 |
| Wet Traction | 100 | 98 | 109 |
| Fuel Efficiency (Rolling Resistance) | 100 | 102 | 110 |

(Index value, the higher value indicates the better physical properties)

Referring to Table 2, it can be confirmed that the final master batches of Examples 2 and 5 have higher bound rubber contents and also have improved dispersibility and mechanical properties of silica, as compared with that of Comparative Example 3. In particular, it can be confirmed that Example 5 has significantly excellent physical properties of compound Mooney viscosity, dispersibility, abrasion resistance, wet traction and fuel efficiency. This is because silica was sufficiently ground such that the dispersibility of silica and the bonding strength thereof with the SSBR polymer were enhanced.

In addition, it can be confirmed that Examples 2 and 5 have excellent wet traction on wet roads and improved abrasion resistance, resulting in excellent fuel efficiency, as compared with Comparative Example 3.

Experimental Example 3

Figure 2:
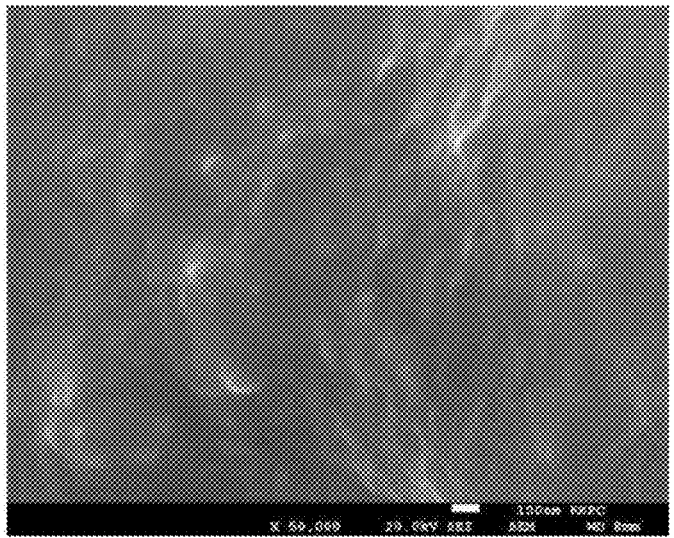
FIG. 2 is an SEM image of a wet master batch elastomer composition according to Comparative Example 4 of the present specification.

In order to evaluate the loss rate and agglomeration of silica with or without an organic silane coupling agent, for Example 2 and Comparative Example 4, the silica loss rates were measured using thermogravimetric analysis (TGA), and the agglomeration of silica was evaluated using SEM analysis. The loss rates and the SEM images of silica are shown below in Table 3 and FIGS. 1 and 2, respectively. FIG. 1 is an SEM image of Example 2, and FIG. 2 is an SEM image of Comparative Example 4.

TABLE 3

|  | Example 2 | Comparative Example 4 |
|---|---|---|
| Silica loss rate (wt. %) | 0.1-0.5% | 1-5% |

Referring to Table 3, it can be confirmed that the silica loss rates of Example 2 and Comparative Example 4 were 0.1 to 0.5 wt. % and 1 to 5 wt. %, respectively. Referring to FIGS. 1 and 2, it can be confirmed that silica particles of Example 2 are more uniformly dispersed. It can be understood therefrom that an organic silane coupling agent imparts the bonding retention strength to the silica and SSBR polymer, resulting in enhancement of silica dispersibility in the matrix.

The foregoing description of the present specification has been presented for illustrative purposes, and it is apparent to a person having ordinary skill in the art that the present specification can be easily modified into other detailed forms without changing the technical idea or essential features of the present specification. Therefore, it should be understood that the forgoing embodiments are by way of example only, and are not intended to limit the present specification. For example, each component which has been described as a unitary part can be implemented as distributed parts. Likewise, each component which has been described as distributed parts can also be implemented as a combined part.

The scope of the present specification is presented by the accompanying claims, and it should be understood that all changes or modifications derived from the definitions and scopes of the claims and their equivalents fall within the scope of the present specification.

What is claimed is:

1. A method for preparing a wet master batch elastomer composition, the method comprising:
   a first step of feeding silica particles and an organic silane coupling agent into an SSBR polymer solution; and
   a second step of grinding the silica particles, while stirring the SSBR polymer solution into which the silica particles and the organic silane coupling agent are fed,
   wherein a ratio of an average particle size of the ground silica particles to an average particle size of the silica particles is less than or equal to 0.8, and
   wherein the wet master batch elastomer composition has a bound rubber content of 30 to 80 wt. %.

2. The method of claim 1, wherein a ratio of an average particle size of the ground silica particles to an average particle size of the silica particles is less than or equal to 0.5.

3. The method of claim 2, wherein a ratio of an average particle size of the ground silica particles to an average particle size of the silica particles is less than or equal to 0.2.

4. The method of claim 1, wherein the stirring is performed by a grinding stirrer.

5. The method of claim 4, wherein a stirring rate of the stirring is greater than or equal to 1,000 rpm.

6. The method of claim 4, wherein a stirring time of the stirring is 0.1 to 60 minutes.

7. The method of claim 1, wherein a content of the silica particles is 40 to 200 parts by weight based on 100 parts by weight of the SSBR polymer.

8. The method of claim 1, wherein the organic silane coupling agent comprises a first organic silane compound represented by Formula 1 and a second organic silane compound represented by Formula 2:

$(R_1O)_3—Si—R_2—S—R_3OR_4$    [Formula 1]

wherein $R_1$ and $R_3$ are an aliphatic hydrocarbon group having 1 to 4 carbon atoms, $R_2$ is an aliphatic hydrocarbon group having 3 to 8 carbon atoms, and $R_4$ is an aliphatic hydrocarbon group having 1 to 20 carbon atoms,

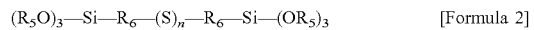

$(R_5O)_3—Si—R_6—(S)_n—R_6—Si—(OR_5)_3$    [Formula 2]

wherein each $R_5$ is independently an aliphatic hydrocarbon group having 1 to 4 carbon atoms, each $R_6$ is independently an aliphatic hydrocarbon group having 3 to 8 carbon atoms, and n is an integer of 1 to 4.

9. The method of claim 1, wherein a content of the organic silane coupling agent is 0.1 to 20 parts by weight based on 100 parts by weight of the SSBR polymer.

* * * * *